UNITED STATES PATENT OFFICE.

FRIEDRICH SCHMIDT AND KARL SCHIRMACHER, OF HÖCHST-ON-THE-MAIN, GERMANY, ASSIGNORS TO FARBWERKE, VORM. MEISTER, LUCIUS & BRÜNING, OF HÖCHST-ON-THE-MAIN, GERMANY, A CORPORATION OF GERMANY.

ORTHO-OXYAZO DYE.

No. 826,282.     Specification of Letters Patent.     Patented July 17, 1906.

Application filed August 4, 1905. Serial No. 272,632.

*To all whom it may concern:*

Be it known that we, FRIEDRICH SCHMIDT, Ph. D., and KARL SCHIRMACHER, Ph. D., chemists, citizens of the Empire of Germany, residing at Höchst-on-the-Main, Germany, have invented certain new and useful Improvements in the Manufacture of Ortho-Oxymonoazo Dyestuffs, of which the following is a specification.

We have found that by combining the diazo compound of 3-amido-4-oxy-1-toluene with 1.8.3.6.-dioxynaphthalene-disulfonic acid $(C_{10}H_4(OH)_2(SO_3H)_2,)$ being the so-called "chromotropic" acid, a valuable monoazo dyestuff may be obtained which yields beautiful blue shades of great fastness when fixed as chrome-lake on chrome-mordanted wool or dyed on unmordanted wool and subsequently developed with chromates.

The manufacture of this dyestuff is as follows: Diazotised 3.4.1-ortho-amido-para-cresol is combined with chromotropic acid in a strong caustic alkalin solution or in presence of hydrate of lime.

The composition of the dyestuff in the form of the sodium salt is characterized by the following formula:

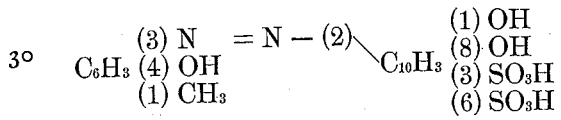

Example: 12.3 kilograms of ortho-amido-para-cresol $(NH_2.OH.CH_3 = 3:4:1)$ are dissolved with thirty kilograms of hydrochloric acid of about 20° Baumé, a solution of 6.9 kilograms of nitrite being gradually added at 0° centigrade. This diazo solution is slowly run into a solution of thirty-eight kilograms of the disodium salt of chromotropic acid, thirty kilograms of finely-divided hydrate of lime having been stirred in. After about twelve hours the formation of the dyestuff is complete. It may then be acidified with hydrochloric acid and the dyestuff precipitated with common salt.

When dry, the dyestuff is a reddish-violet powder, soluble in water with a red color. The aqueous solution becomes blue-violet on addition of a solution of sodium carbonate. On addition of dilute hydrochloric acid hardly any change is produced in the color. In concentrated sulfuric acid the dyestuff dissolves with a blue-violet color. It dyes wool blue-red in an acid-bath. The dyeing of the chrome-lake is blue. On treatment with tin and hydrochloric acid the dyestuff is reduced to ortho-amido-para-cresol and amido-chromotropic acid.

Having now described our invention, what we claim is—

As a new product, the ortho-oxymonoazo dyestuff having as a sodium salt the formula:

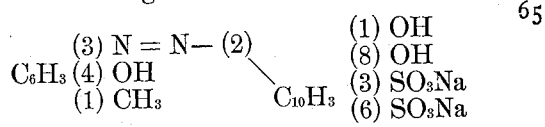

being a reddish-violet powder, soluble in water with a red color, the aqueous solution of which becomes blue-violet on addition of a solution of sodium carbonate, while on addition of dilute hydrochloric acid hardly any change is produced in the color; in concentrated sulfuric acid the dyestuff dissolves with a blue-violet color; on reducing with tin and hydrochloric acid the dyestuff is split into ortho-amido-para-cresol and amido-chromotropic acid; it dyes wool blue-red in an acid-bath, the dyeing of the chrome-lake being blue.

In testimony that we claim the foregoing as our invention we have signed our names in presence of two subscribing witnesses.

FRIEDRICH SCHMIDT.
    KARL SCHIRMACHER.

Witnesses:
  ALFRED BRISBOIS,
  BERNHARD LEYDECKER.